US011909022B1

(12) United States Patent
Soto Infante

(10) Patent No.: US 11,909,022 B1
(45) Date of Patent: Feb. 20, 2024

(54) BATTERY COOLANT CONTROL

(71) Applicant: Rivian IP Holdings, LLC, Plymouth, MI (US)

(72) Inventor: Amilkar Abraham Soto Infante, Los Angeles, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

(21) Appl. No.: 18/146,664

(22) Filed: Dec. 27, 2022

(51) Int. Cl.
*H01M 10/6556* (2014.01)
*H01M 10/6554* (2014.01)
*H01M 10/625* (2014.01)
*H01M 10/613* (2014.01)
*B60L 50/64* (2019.01)

(52) U.S. Cl.
CPC ......... *H01M 10/6556* (2015.04); *B60L 50/64* (2019.02); *H01M 10/613* (2015.04); *H01M 10/625* (2015.04); *H01M 10/6554* (2015.04); *H01M 2220/20* (2013.01)

(58) Field of Classification Search
CPC .......... H01M 10/6556; H01M 10/613; H01M 10/625; H01M 10/6554; H01M 2220/20; B60L 50/64
See application file for complete search history.

(56) References Cited

U.S. PATENT DOCUMENTS

| 11,205,812 B2* | 12/2021 | Hiroe | H01M 50/249 |
| 2015/0171485 A1* | 6/2015 | Rawlinson | B60L 50/64 |
| | | | 429/62 |
| 2019/0077275 A1* | 3/2019 | Capati | H01M 10/63 |

* cited by examiner

*Primary Examiner* — Muhammad S Siddiquee
(74) *Attorney, Agent, or Firm* — Foley & Lardner LLP

(57) ABSTRACT

An apparatus can include one or more valves to couple with a thermal line of a battery pack. The apparatus can include one or more coolant channels to couple with one or more thermal components of the battery pack. The one or more valves can modify coolant flow from the thermal line to the one or more coolant channels.

19 Claims, 13 Drawing Sheets

BATTERY COOLANT CONTROL

INTRODUCTION

Electric vehicles can include various electrical components that provide power to the vehicle. The electrical components can be electrically coupled with vehicle components to power the vehicle.

SUMMARY

An apparatus of a battery pack can include at least one main line for a coolant to flow through. The main line can fluidly couple with at least one cold plate by a cooling channel. The apparatus can include at least one valve fluidly coupled with the main line and at least one cooling channel to control flow of the coolant between the main line and one or more cold plates. The one or more valves can facilitate controlling flow of the coolant between various cold plates of the battery pack. For example, the one or more valves can cause the coolant within the main line to at least partially bypass at least one cold plate. By causing the coolant to at least partially bypass a cold plate, more coolant can flow to another cold plate that is not bypassed by the valve (e.g., by following the path of least resistance). The valves can further facilitate controlling flow of coolant within the cold plates such that coolant does not flow through multiple cold plates during one cycle (e.g., from entering an inlet of the main line and exiting an outlet of the main line without passing through a chiller). Therefore, the valves can facilitate minimizing a temperature difference between the plurality of cold plates in the battery pack by controlling fresh, cool coolant flow to various cold plates despite the cold plate positioning relative to the inlet of the main line or a chiller that cools the coolant.

At least one aspect is directed to an apparatus. The apparatus can include one or more valves to couple with a thermal line of a battery pack. The apparatus can include one or more coolant channels to couple with one or more thermal components of the battery pack. The one or more valves can modify coolant flow from the thermal line to the one or more coolant channels.

At least one aspect is directed to a method. The method can include coupling a valve with a main line of a battery pack. The method can include coupling, by the valve, the main line of the battery pack with a cooling channel of a cold plate.

At least one aspect is directed to an electric vehicle. The electric vehicle can include a valve that can couple with a main line of a battery pack. The valve can couple the main line of the battery pack with a cooling channel of a cold plate.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of controlling and managing flow of a coolant within a battery pack. The various concepts introduced above and discussed in greater detail below may be implemented in any of numerous ways.

The present disclosure is directed to systems and methods of controlling and managing flow of a coolant within a battery pack. An apparatus of a battery pack can include at least one main line for a coolant to flow through. The main line can fluidly couple with at least one cold plate by a cooling channel. The apparatus can include at least one valve fluidly coupled with the main line and a cooling channel to control flow of the coolant between the main line and one or more cold plates. The one or more valves can facilitate controlling flow of the coolant between various cold plates of the battery pack. For example, the one or more valves can cause the coolant within the main line to at least partially bypass at least one cold plate. By causing the coolant to at least partially bypass a cold plate, more coolant can flow to another cold plate that is not bypassed by the valve (e.g., by following the path of least resistance). The valves can further facilitate controlling flow of coolant within the cold plates such that coolant does not flow through multiple cold plates during one cycle (e.g., from entering an inlet of the main line and exiting an outlet of the main line without passing through a chiller). Therefore, the valves can facilitate minimizing a temperature difference between the plurality of cold plates in the battery pack by controlling fresh, cool coolant flow to various cold plates despite the cold plate positioning relative to the inlet of the main line or a chiller that cools the coolant.

The disclosed solutions have a technical advantage of reducing or minimizing a temperature difference between multiple cold plates of a battery pack. For example, as a coolant flows through each cold plate, a temperature of the coolant can rise due to heat transfer between the coolant and the cold plates or battery cells. Therefore, by the time the coolant flows through one of the last cold plates (e.g., towards an outlet of the battery pack), the coolant may be too warm to effectively cool the battery cells within the battery pack. The disclosed solutions include controlling means for managing flow of a coolant between particular cold plates. Further, the disclosed solutions include means for pumping coolant through only one (or more) cold plates such that the coolant is not necessarily recirculated through a plurality of cold plates without being refreshed through a chiller. Therefore, the disclosed solutions effectively and efficiently cool battery cells within a battery pack.

Figure 1:
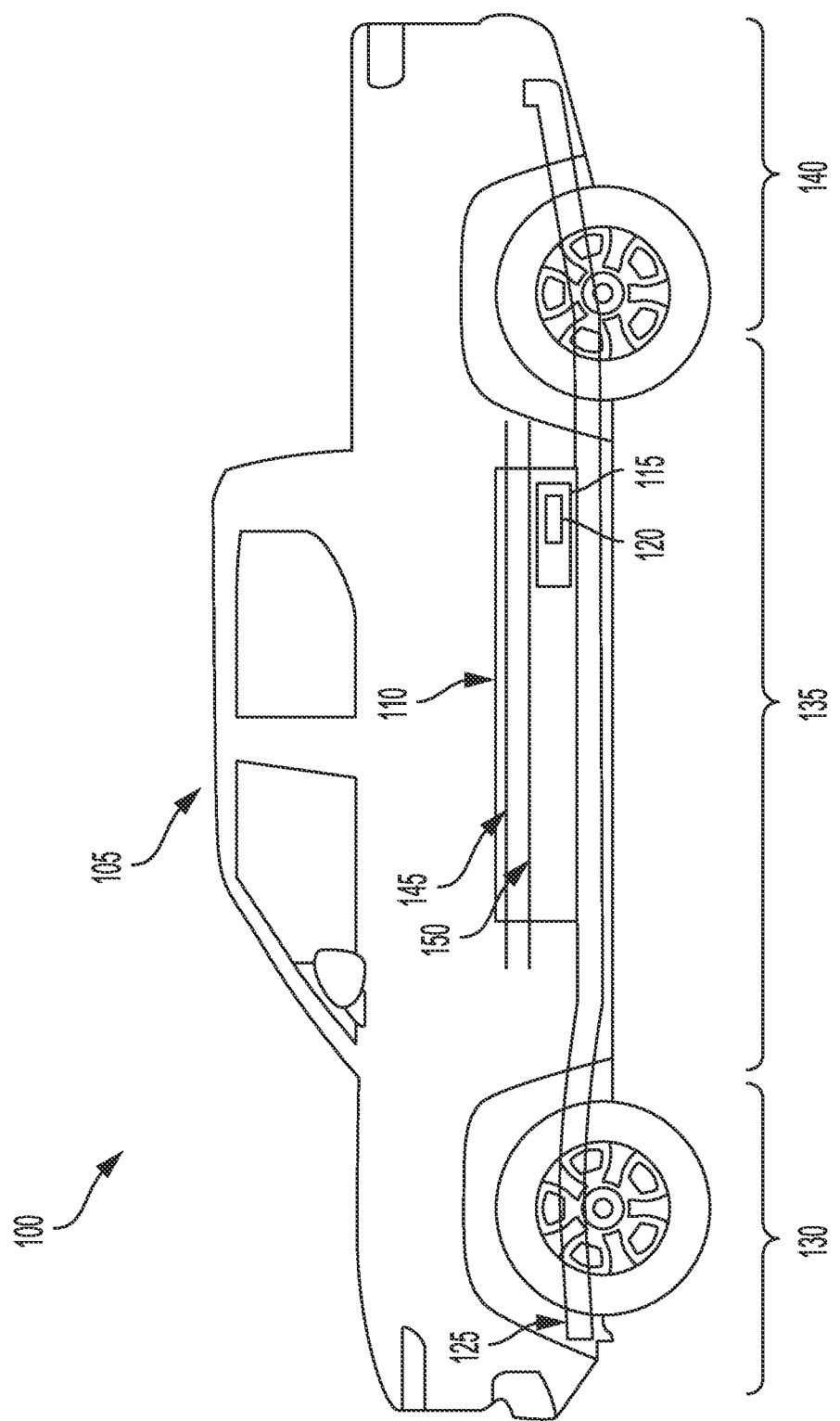
FIG. 1 depicts an example side view of an electric vehicle, in accordance with implementations.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2A:
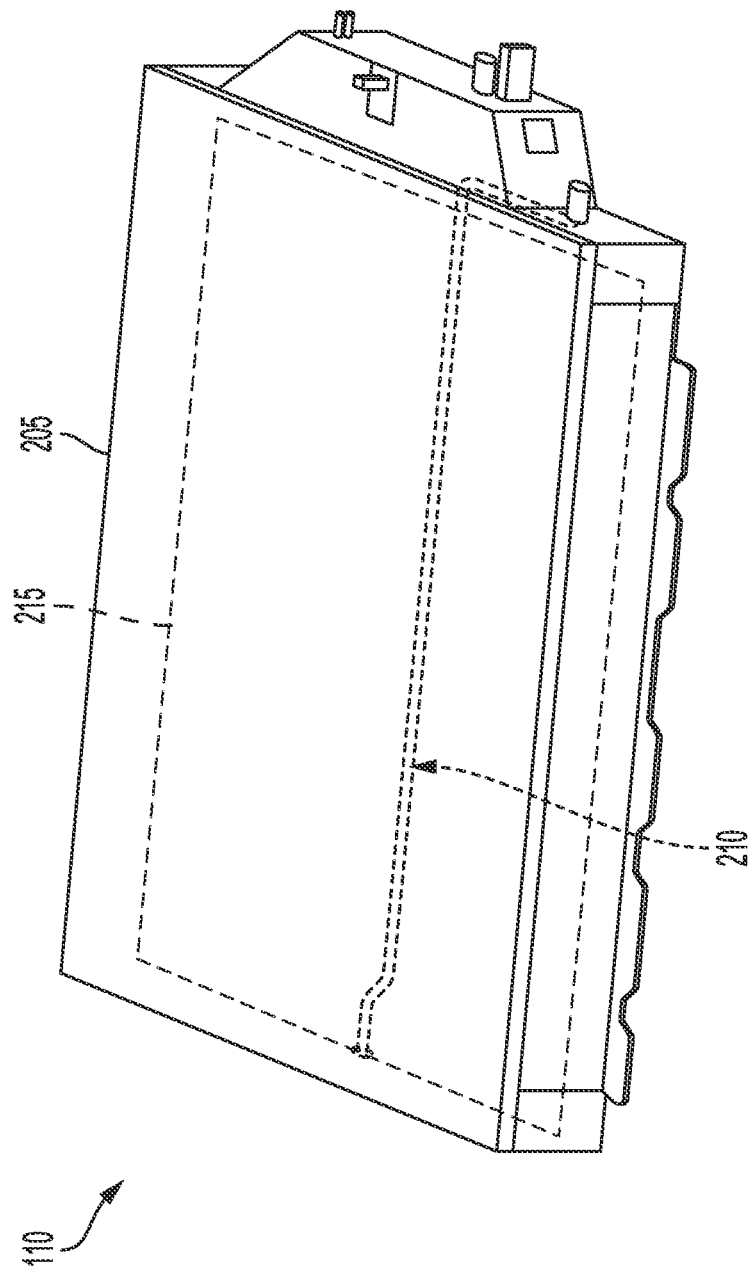
FIG. 2A depicts an example perspective view of a battery pack, in accordance with implementations.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
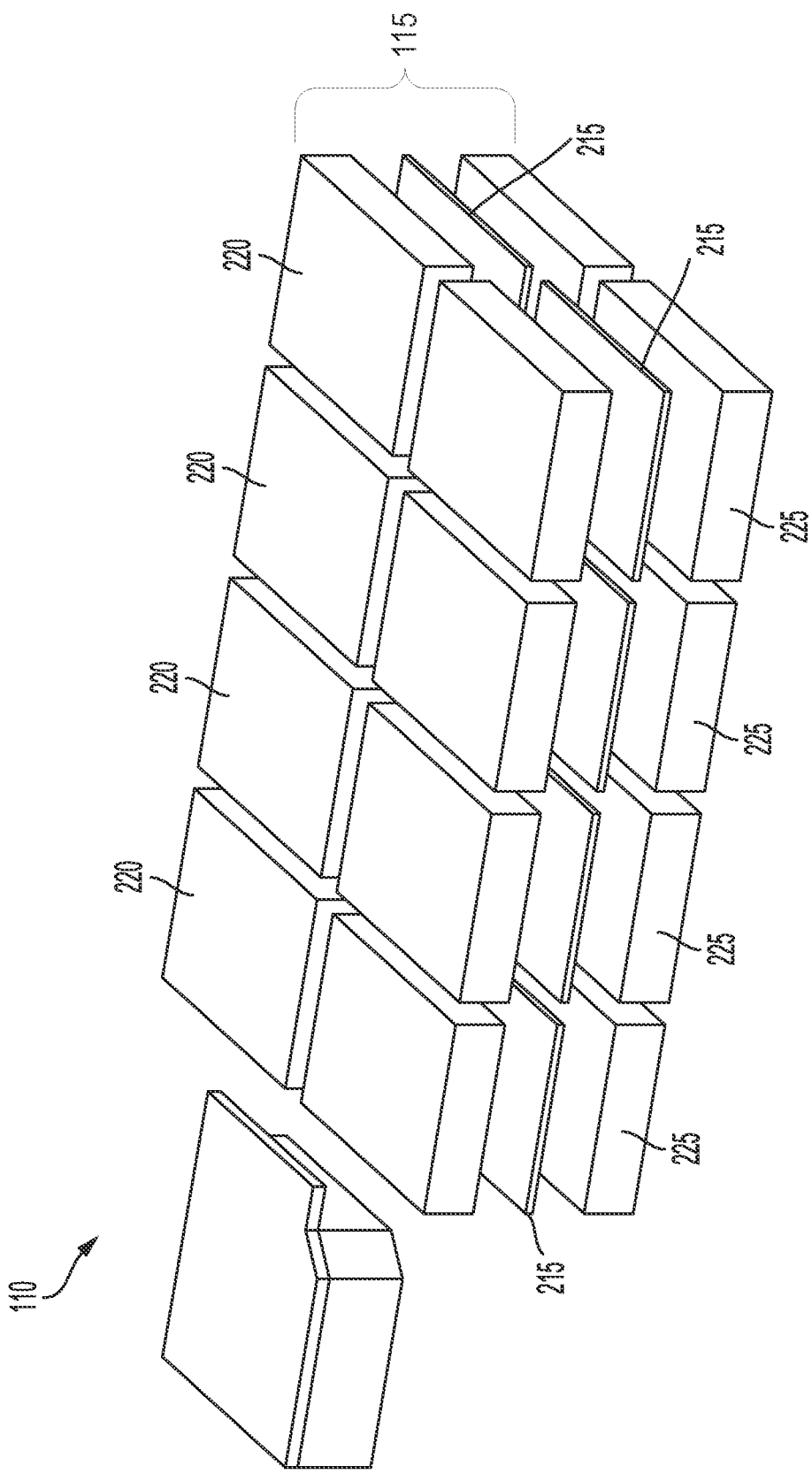
FIG. 2B depicts an example perspective view of a battery module, in accordance with implementations.
Figure 2C:
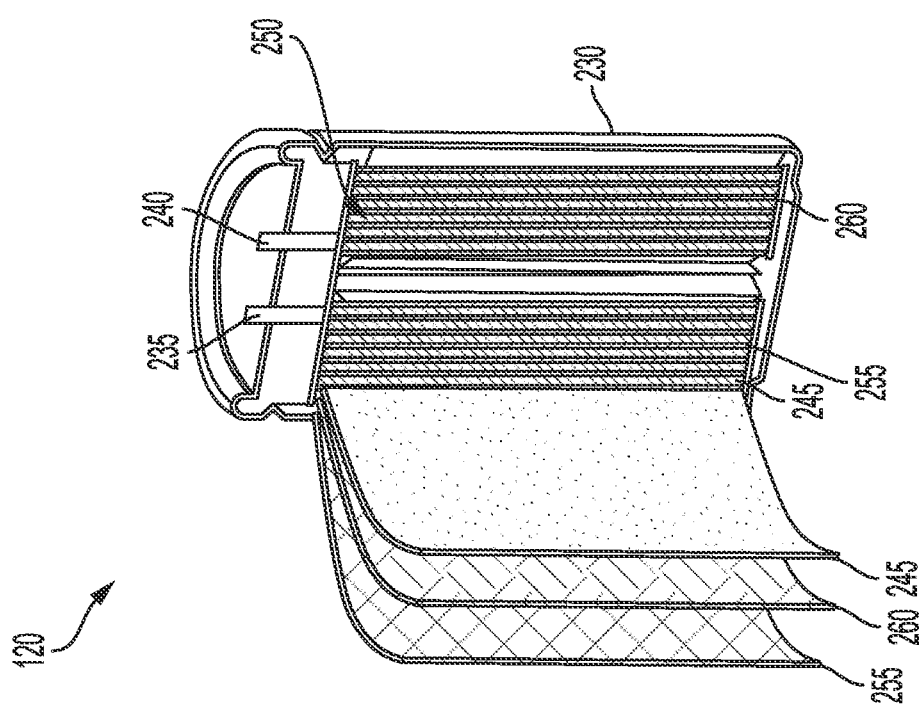
FIG. 2C depicts an example perspective view of a battery cell, in accordance with implementations.
Figure 2D:
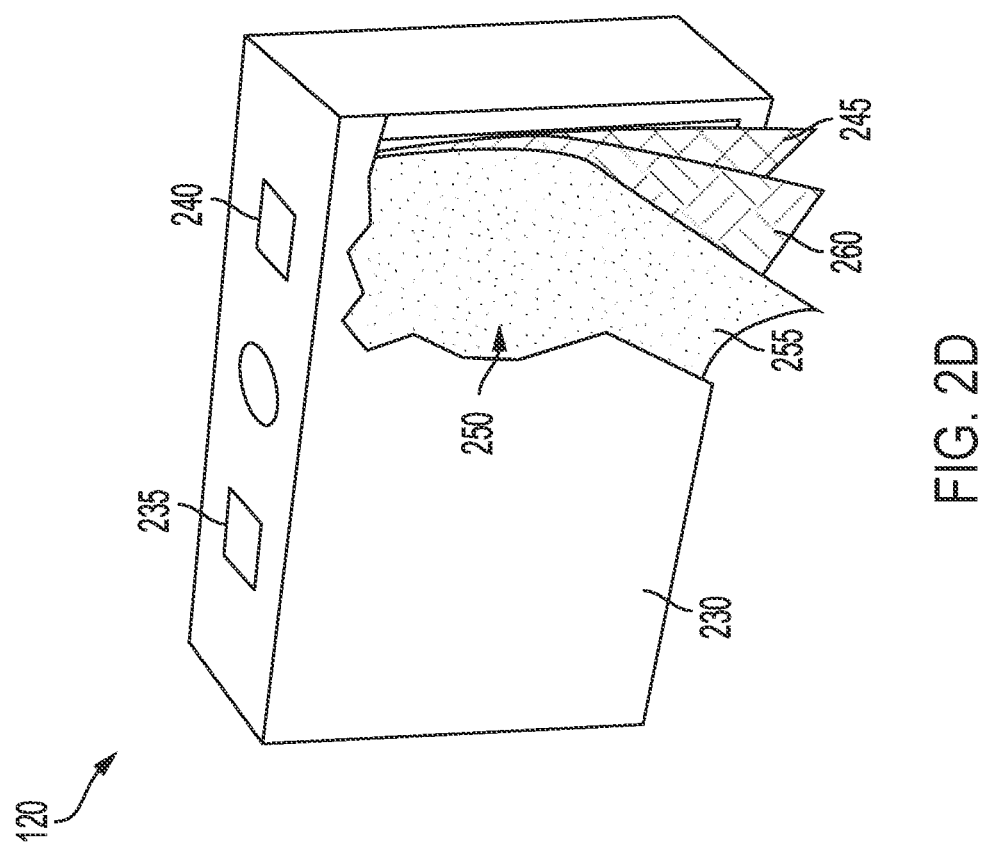
FIG. 2D depicts an example perspective view of a battery cell, in accordance with implementations.
Figure 2E:
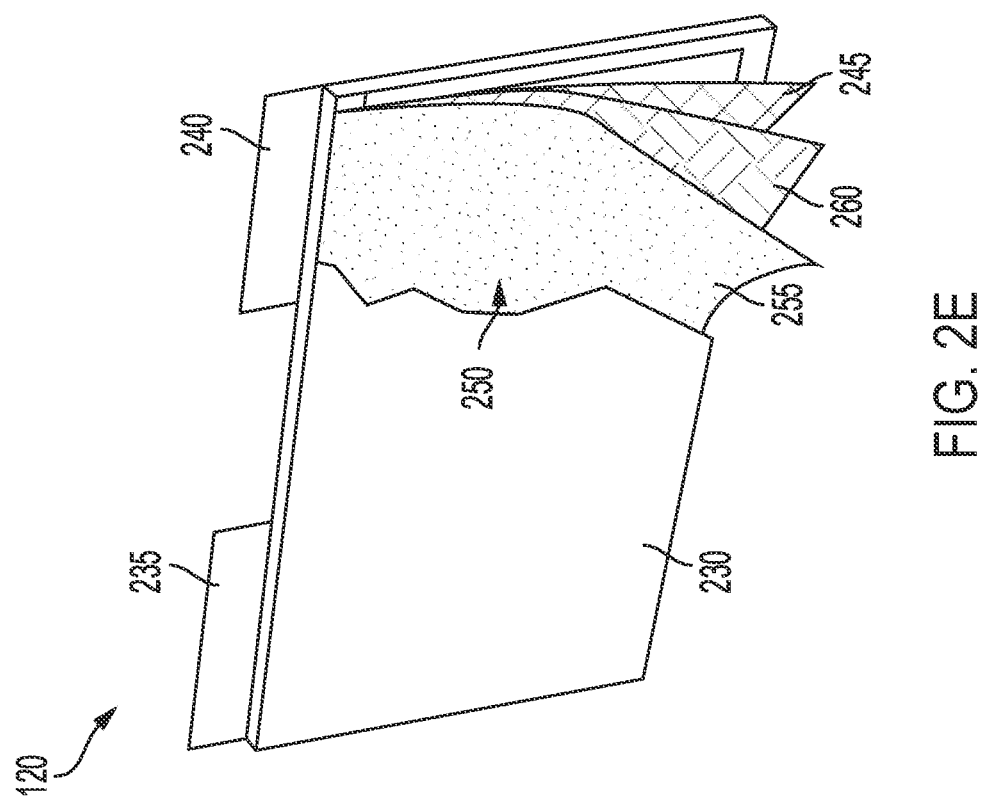
FIG. 2E depicts an example perspective view of a battery cell, in accordance with implementations.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxynitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S-P_2S_5$, $Li_2S-B_2S_3$, $SnS-P_2S_5$, $Li_2S-SiS_2$, $Li_2S-P_2S_5$, $Li_2S-GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

Figure 2F:
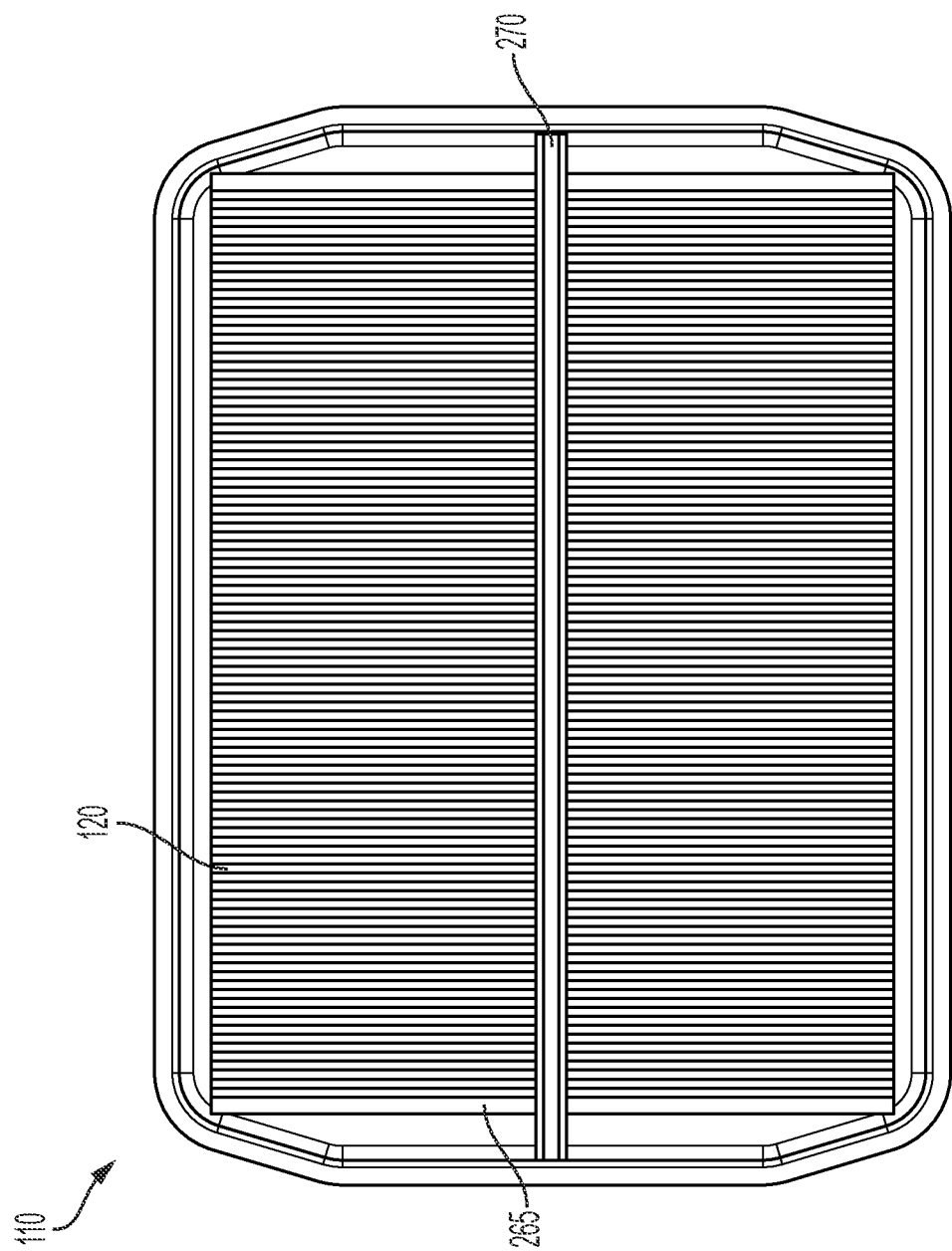
FIG. 2F depicts an example top view of a battery pack, in accordance with implementations.
Figure 2G:
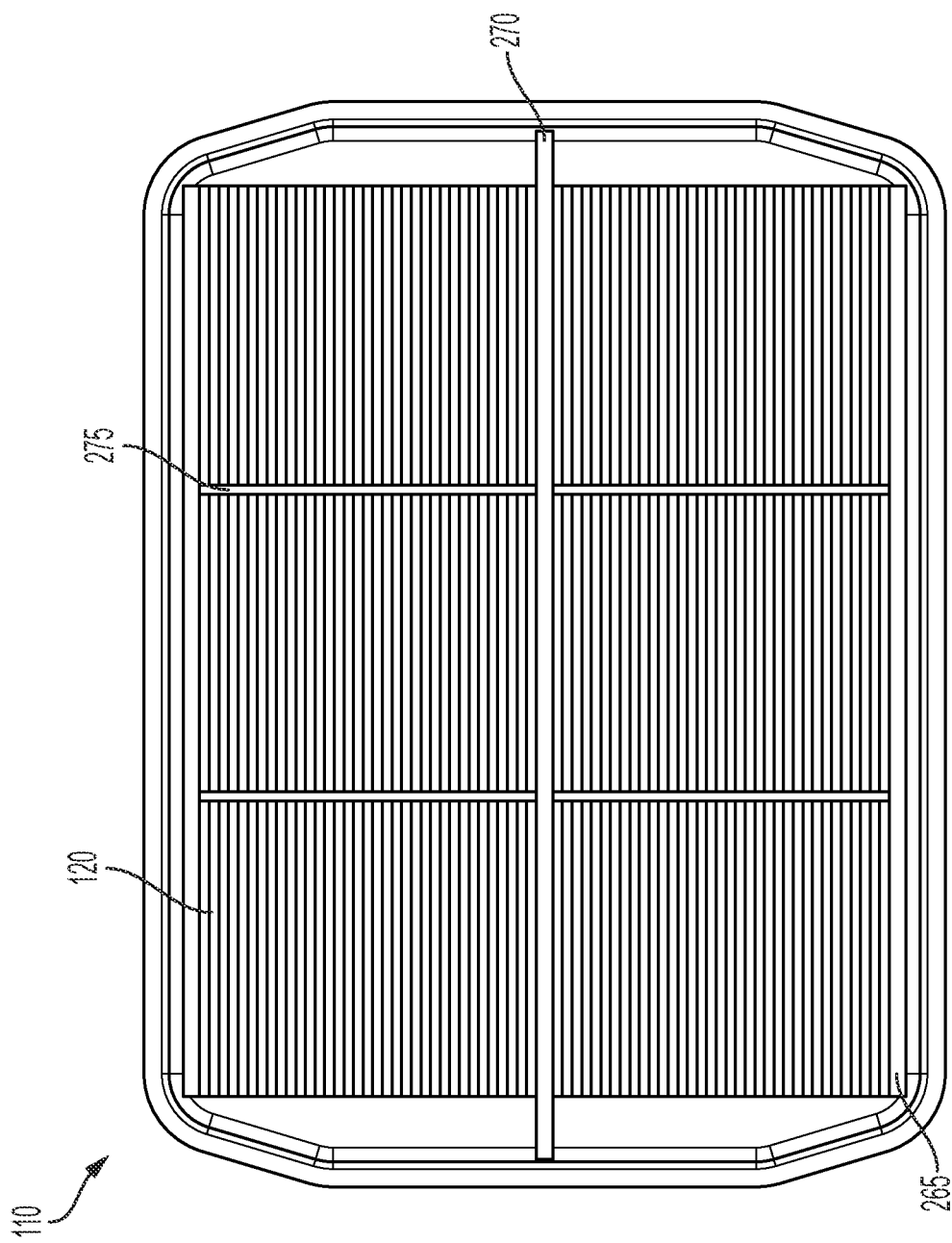
FIG. 2G depicts an example top view of a battery pack, in accordance with implementations.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules (e.g., module-free). For example, as depicted in FIGS. 2F and 2G, the battery pack can have a module-free or cell-to-pack configuration where the battery cells 120 are arranged directly into a battery pack 110 without assembly into a module. In these embodiments, the battery pack 110 can include compression members 265 that facilitate managing swelling of the battery cells 120. A structural member 270 (e.g., cross beam) can also facilitate managing swelling of the battery cells 120. As depicted in FIG. 2G, the battery pack 110 can include one or more areas 275 for interconnections in which the cells 120 are joined together (e.g., electrically) using a busbar or welding.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li-Mg, Li-Al, Li-Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li-Mg, Li-Al, Li-Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also receive lithium ions during the discharging of the battery cell 120. Conversely, the cathode layer 255 can receive electrical current into the battery cell 120 and can output electrons during the charging of the battery cell 120. The cathode layer 255 can release lithium ions during the charging of the battery cell 120.

The battery cell 120 can include a layer 260 disposed within the cavity 250. The layer 260 can include a solid electrolyte layer. The layer 260 can include a separator wetted by a liquid electrolyte. The layer 260 can include a polymeric material. The layer 260 can include a polymer separator. The layer 260 can be arranged between the anode layer 245 and the cathode layer 255 to separate the anode layer 245 and the cathode layer 255. The polymer separator can physically separate the anode and cathode from a cell short circuit. A separator can be wetted with a liquid electrolyte. The liquid electrolyte can be diffused into the anode layer 245. The liquid electrolyte can be diffused into the cathode layer 255. The layer 260 can help transfer ions (e.g., $Li^+$ ions) between the anode layer 245 and the cathode layer 255. The layer 260 can transfer $Li^+$ cations from the anode layer 245 to the cathode layer 255 during the discharge operation of the battery cell 120. The layer 260 can transfer lithium ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LiMPO_4O_x$, M=Ti, V, Mn, Cr, and Zr), for example lithium iron phosphate (LFP), lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(m-ethyl acrylate) (PMA), poly(vinyl alcohol) (PVA) , poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The layer 260 can include or be made of a liquid electrolyte material. For example, the layer 260 can be or include at least one layer of polymeric material (e.g., polypropylene, polyethylene, or other material) including pores that are wetted (e.g., saturated with, soaked with, receive, are filled with) a liquid electrolyte substance to enable ions to move between electrodes. The liquid electrolyte material can include a lithium salt dissolved in a solvent. The lithium salt for the liquid electrolyte material for the layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. Liquid electrolyte is not necessarily disposed near the layer 260, but the liquid electrolyte can fill the battery cells 120 in many different ways. The layer 260 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S-P_2S_5$, $Li_2S-B_2S_3$, $SnS-P_2S_5$, $Li_2S-SiS_2$, $Li_2S-P_2S_5$, $Li_2S-GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the layer 260 includes a liquid electrolyte material, the layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The layer 260 can include at least one additive. The additives can be or include vinylidene carbonate, fluoroethylene carbonate, ethyl propionate, methyl propionate, methyl acetate, ethyl acetate, or a mixture of any two or more thereof. The layer 260 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the layer 260 from greater than 0 M to about 1.5 M. Once disposed to the battery cell 120, liquid electrolyte can be present and touching battery subcomponents present within the battery cell 120. The battery subcomponents can include the cathode, the anode, the separator, the current collector, etc.

Figure 3:
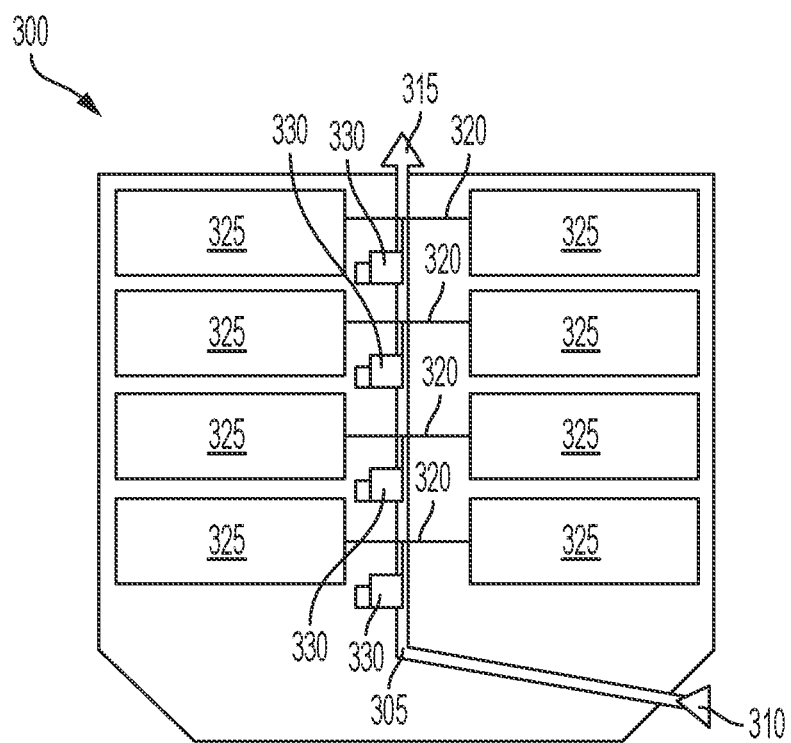
FIG. 3 depicts an example schematic of an apparatus, in accordance with implementations.

FIG. 3 depicts an example apparatus 300. The apparatus 300 can be or can include a portion of a battery (e.g., of a battery pack 110, of a battery module 115, or of a battery cell 120). For example, the apparatus 300 can include at least one battery cell 120 and at least one cold plate 325. The cold plate 325 can be or can include one or more thermal components 215. The apparatus 300 can include or can couple with one or more battery cells 120 or battery modules 115. For example, at least one cold plate 325 can couple with a battery cell 120 or a battery module 115. For example, the cold plate 325 can include one or more cooling pathways for fluid to flow through. The fluid flowing through the cooling pathways of the cold plates 325 can facilitate cooling battery cells 120 coupled with the cold plate 325, battery modules 115 coupled with the cold plate 325, or any combination thereof.

The apparatus 300 can include at least one main line 305. For example, the main line can be or can include one or more channels, pipes, tubes, pathways, or other components that facilitate transporting a fluid, such as a thermal fluid. For example, the main line 305 can be or can include a thermal line (e.g., a channel that facilitates transporting fluid having one or more thermal effects). The main line 305 can include one or more physical components coupled together to form the main line 305 (e.g., one or more pipes or connectors connected together). The main line 305 can include at least one inlet 310 and at least one outlet 315. For example, the main line 305 can receive a coolant at the inlet 310 and can provide a channel for the coolant to travel through the main line to or out of the outlet 315.

The main line 305 can receive, expel, or distribute one or more fluids (e.g., coolant, air, or other fluids) to or from the one or more cold plates 325. For example, the apparatus 300 can include at least one cooling or coolant channel 320. The cooling channels 320 can include one or more pipes, tubes, channels, lines, pathways, or other components that facilitate transporting a fluid. Each cooling channel 320 can include one or more physical components coupled together to form the fluid channel 320 (e.g., one or more pipes or connectors connected together). The cooling channels 320 can fluidly couple the main line 305 with one or more cold plates 325 (e.g., directly or indirectly).

The apparatus 300 can include at least one valve 330. For example, the valve 330 can be or can include one or more valves, flow regulators, actuators, or other components. For example, the valve 330 can be or can include any one of a two-way valve, a three-way valve, a four-way valve, a five-way valve, a solenoid valve, an actuator, a ball valve, a flow restrictor, any combination thereof, or another type of valve.

The valve 330 can couple with the main line 305 of the apparatus 300. For example, at least one valve 330 can fluidly couple with the main line 305 to control or regulate fluid flowing through the main line 305 through the valve 330 (e.g., by modifying coolant flow). For example, the valves 330 can modify coolant flow in various ways including modifying coolant flow rates (e.g., anywhere between 0 LPM and 20 LPM). As another example, multiple valves 330 can fluidly couple with the main line 305 at multiple locations of the main line 305 to control or regulate fluid flowing through the main line 305.

The valve 330 can couple the main line with at least one cooling channel 320 coupled with a cold plate 325. For example, at least one valve 330 can fluidly couple with at least one cooling channel 320 to control or regulate fluid flow between the main line 305 and the cooling channel 320. As another example, multiple valves 330 can each fluidly couple with one or more cooling channels 320 each fluidly coupled with one or more cold plates 325 to control or regulate fluid flow between the main line 305 and each cold plate 325 through the cooling channels 320.

For example, the inlet 310 of the main line 305 of the apparatus 300 (e.g., of the battery pack 110) can receive a coolant. The coolant can flow through the main line 305. The coolant can flow from the main line 305 through at least one cooling channel 320 fluidly coupled with the main line 305 (e.g., when at least one opening of a valve 330 is open or at least partially open). The coolant within the cooling channel 320 can flow through or to at least one cold plate 325. The coolant within the cold plate 325 can facilitate cooling (or warming) one or more battery cells 120 or battery modules 115 coupled with the cold palte 325.

The coolant can flow through the main line 305 in various directions. For example, the coolant can flow from the inlet 310 of the main line 305 towards the outlet 315 of the main line 305. For example, the one or more valves 330 can synchronize to direct coolant flow in multiple directions. The one or more valves 330 can operate independently to direct coolant flow in multiple directions (e.g., between the main line 305 and the cooling channels 320). For example, one valve 330 can cause coolant to flow in a first direction and another valve 330 can cause coolant to flow in a second direction. The coolant can flow from the outlet 315 of the main line 305 towards the inlet 310 of the main line 305. The one or move valves 330 can facilitate modifying coolant flow in either direction (e.g., a first direction from the inlet 310 towards the outlet 315 or a second direction from the outlet 315 towards the inlet 310). The coolant can flow from a cooling channel 320 towards the main line 305 or from the main line 305 towards the cooling channel 320. The one or move valves 330 can facilitate modifying coolant flow in either direction (e.g., a first direction from the main line 305 towards a cooling channel 320 or a second direction from the cooling channel 320 towards the main line 305).

The one or more valves 330 can facilitate controlling fluid flow between the one or more cold plates 325 (e.g., by restricting amount of flow between the cold plates 325). For example, the apparatus 300 can include one valve 330 fluidly coupled with the main line. The valve 330 can include a plurality of openings that are each coupled with a respective cooling channel 320 and cold plate 325 (e.g., such that a ration of number of valves 330 to number of cold plates 325 is greater than or equal to 1:2). One opening of a valve 330 can be fluidly coupled with a first fluid channel 320 that is fluidly coupled with a first cold plate 325. Another opening of the valve 330 can be fluidly coupled with a second fluid channel 320 that is fluidly coupled with a second cold palte 325. The valve 330 can modify coolant flow by causing coolant within the main line 305 to at least partially bypass (or entirely bypass) the first cooling channel 320 while allowing the coolant within the main line 305 to enter the second cooling channel 320. For example, the valves 330 can cause the coolant to at least partially bypass one or more cooling channels 320 because thermistors coupled with the one or more valves 330 or cooling channels 320 can measure above-average battery cells 120 near a first cooling channel 320 (e.g., far from the chiller) but average temperature battery cells 120 near a second cooling channel 320 (e.g., closer to the chiller) such that the coolant bypasses the first coolant channel 320 to cool the second cooling channel 320 more efficiently. For example, the first cold plate 325 coupled with the first opening of the valve 330 can be positioned further from the inlet 310 of the main line 305 than the second cold plate 325 coupled with the second opening of the valve 330 (e.g., the second cold plate 325 is located downstream of the first cold plate 325). In some circumstances, there may be a difference in temperature of the coolant from the inlet 310 of the main line 305 to the outlet 315 of the main line 305. Therefore, at least partially bypassing the first cold plate 325 such that more fluid flows to the second cold plate 325 can facilitate minimalizing a temperature difference between the first and second cold plates 325. The valve 330 can cause the coolant to flow in a reverse direction (e.g., towards the inlet 310).

The apparatus 300 can include a plurality of valves 330. For example, the apparatus 300 can include a plurality of valves 330 that are each fluidly coupled with a cooling channel 320. Each cooling channel 320 can be fluidly coupled with at least one cold plate 325 (e.g., such that the ratio of valves 330 to cold plates is 1:1). A first valve 330 can be fluidly coupled with a first fluid channel 320 that is fluidly coupled with a first cold plate 325. A second valve 330 can be fluidly coupled with a second fluid channel 320 that is fluidly coupled with a second cold palte 325. The first valve 330 can modify coolant flow by causing coolant within the main line 305 to at least partially bypass (or entirely bypass) the first cooling channel 320 while allowing the coolant (e.g., the at least partially bypassed coolant) within the main line 305 to enter the second cooling channel 320. For example, the first cold plate 325 coupled with the first valve 330 can be positioned further from the inlet 310 of the main line 305 than the second cold plate 325 coupled with the second valve 330 (e.g., the second cold plate 325 is located downstream of the first cold plate 325). In some circumstances, there may be a difference in temperature of the coolant from the inlet 310 of the main line 305 to the outlet 315 of the main line 305. Therefore, at least partially bypassing the first cold plate 325 such that more fluid flows to the second cold plate 325 can facilitate minimalizing a temperature difference between the first and second cold plates 325. The valves 330 can cause the coolant to flow in a reverse direction (e.g., towards the inlet 310).

One or more openings of a valve 330 (e.g., openings fluidly coupled with the cooling channels 320) or one or more valves 330 can each open or close various amounts. For example, a first valve 330 can be at least partially opened (e.g., 25% open) to allow a small amount of coolant through the first valve 330. At the same time (or at a different time), a second valve 330, or a second opening of the first valve 330) can be opened a greater or lesser amount (e.g., more or less than 25% open) such that the amount of fluid flowing between the first valve 330 and the second valve 330 differs.

The apparatus 300 can include any amount of valves 330, cooling channels 320, or cold plates 325. For example, the apparatus 300 can include 8 cold plates 325. The apparatus 300 can include 8 cooling channels 320 each respectively coupled with a cold plate 325. The apparatus 300 can include one valve 330 that can fluidly couple with each of the 8 cooling channels 320. The apparatus 300 can include two valves 330 that can each fluidly couple to a subset of the 8 cooling channels 320 (e.g., 4 channels 320 each). The apparatus 300 can include four valves 330 that can each fluidly couple to a subset of the 8 cooling channels 320 (e.g., 2 channels 320 each). The apparatus 300 can include eight valves 330 that can each fluidly couple to a subset of the 8 cooling channels 320 (e.g., 1 channel 320 each). This example is for illustrative purposes. The apparatus 300 can include substantially more or less valves 330, cooling channels 320, or cold plates 325. For example, the apparatus 300 can include 0-100 valves 330, 0-100 cooling channels 320, or 0-100 cold plates 325.

The valves 330 of the apparatus 300 can be located in various positions of the apparatus 300. For example, a valve 330 can be positioned at or near the main line 305 to control fluid flow from the main line 305 to a cooling channel 320. A valve 330 can be positioned at or near the cold plate on a cooling channel 320 to control fluid flow from the main line 305 to the cooling channel 320, as another example.

Figure 6:
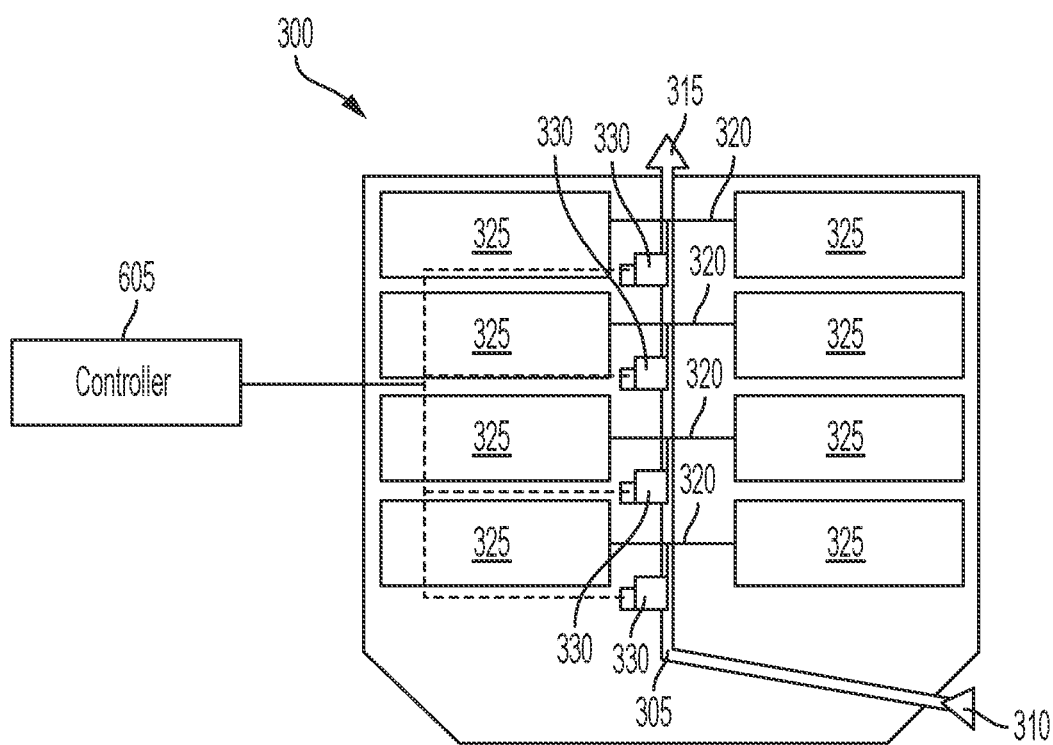
FIG. 6 depicts an example schematic of the apparatus of FIG. 3, in accordance with implementations.

At least one valve 330 can operably or communicably couple with one or more electrical systems of the vehicle 105 in which the apparatus 300 is located. For example, as depicted in at least FIG. 6, at least one valve 330 can communicably couple with a controller 605 that facilitates controlling the valves 330. For example, the controller 605 can receive and transmit signals to or from the one or more valves 330 to cause the one or more valves 330 to open or close a certain amount. For example, at least one valve 330 can communicably couple with another portion of the vehicle 105 through CAN or LIN communication. For example, the valve 330 can receive signals from a portion of the vehicle 105 (e.g., ECU, CPU, BMS, or another portion of the vehicle 105) that causes the valve 330 to at least partially or entirely inhibit fluid flow from the main line 305 to at least one cold plate 325. The signals can be response to one or more parameters of the battery pack 110 or vehicle 105 including, but not limited to, temperature of battery cells 120 or modules 115 (e.g., detected by one or more sensors, such as a thermistor, coupled with the battery pack 110), time (e.g., bypasses fluid flow to one or more cold plates 325 based on a predetermined amount of time (e.g., valves 330 closest to inlet 310 close after a few minutes to even out cooling to cold plates 325 furthest from the inlet 310), based on a cycle, or another measure of time), based on a predetermined map of the cold plates 325, based on a temperature of a coolant within the main line 305, or based on an operation of the battery pack 110 or vehicle (e.g., during fast charging of the battery cells 120, during various driving conditions such as driving up a hill or being stuck in traffic, when the vehicle 105 is in an excessively warm climate such as above 32° C.). Changing of the valves 330 can be dynamic or static. For example, the valves 330 can be constantly opening or closing or the valves 330 can maintain in one position for a predetermined amount of time (e.g., 10 seconds, 30 seconds, or another amount of time).

The apparatus 300 can include one or more components that facilitate pumping the coolant through the main line 305 such that the coolant flows only in one direction (e.g., from the inlet 310 towards the outlet 315 or from the outlet 315 towards the inlet 310). For example, the apparatus 300 can include a pump. The apparatus 300 can cause the coolant to flow through only one cold plate 325 at a time during a cycle of cooling. For example, the cycle can be or can include any volume of coolant that flows from the inlet 310 of the main line 305 towards the outlet 315 of the main line 305 without passing through a chiller that facilitates refreshing (e.g., cooling) the coolant. For example, the one or more valves 330 can facilitate directing flow of coolant from the main line 305, through one cooling channel 320, to one cold plate 325, back to the main line 305, and out the outlet 315 of the main line 305 (e.g., as opposed to coolant flowing through each of the cold plates 325 within the apparatus 300). The apparatus 300 or another portion of the vehicle 105 can include a chiller for the coolant to flow through after exiting the outlet 315 of the main line 305. As described herein, the apparatus 300 can facilitate reducing a temperature difference between one or more cold plates 325 of a battery pack 110 as compared to conventional techniques. For example, the apparatus 300 can facilitate reducing a temperate difference between at least two cold plates 325 of the battery pack 110 by 5% of more than conventional techniques.

Figure 4:
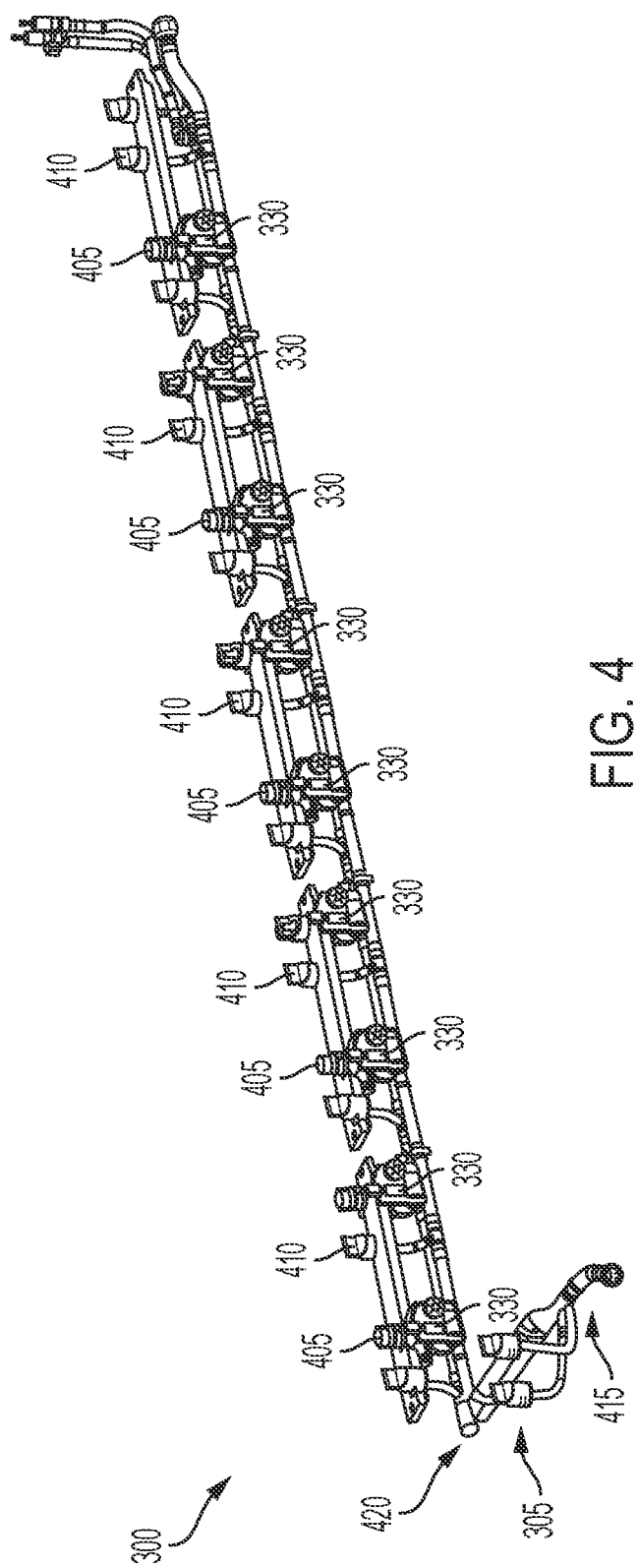
FIG. 4 depicts an example perspective view of a portion of the apparatus of FIG. 3, in accordance with implementations.

FIG. 4 is a perspective view of a portion of the apparatus 300. For example, FIG. 4 depicts a portion of the main line 305 of the apparatus 300. As depicted in FIG. 4, and among others, the main line 305 of the apparatus 300 can include an ingress channel 415 and an egress channel 420. The ingress channel 415 can be positioned at least partially near the inlet 310 of the main line 305 and the egress channel 420 can be positioned at least partially near the outlet 315 of the main line 305.

The ingress channel 415 or the egress channel 420 can include at least one channel inlet 405 and at least one channel outlet 410. For example, the channel inlet 405 and the channel outlet 410 can form the fluid channels 320 described herein. The channel inlets 405 can allow coolant from the main line 305 into (or near) a cold plate 325 to cool a battery cell 120 or battery module 115. The channel outlets 410 can allow coolant from the cold plate 325 back into the main line 305. At least one of the channel inlet 405 or the channel outlet 410 can be or can couple with at least one valve 330. For example, as described herein and as depicted in at least FIG. 4, the apparatus 300 can include at least as many valves 330 as channel inlets 405 such that the ratio of number of cold plates 325 (and inlets 405) to number of valves 330 is 1:1.

Figure 5:
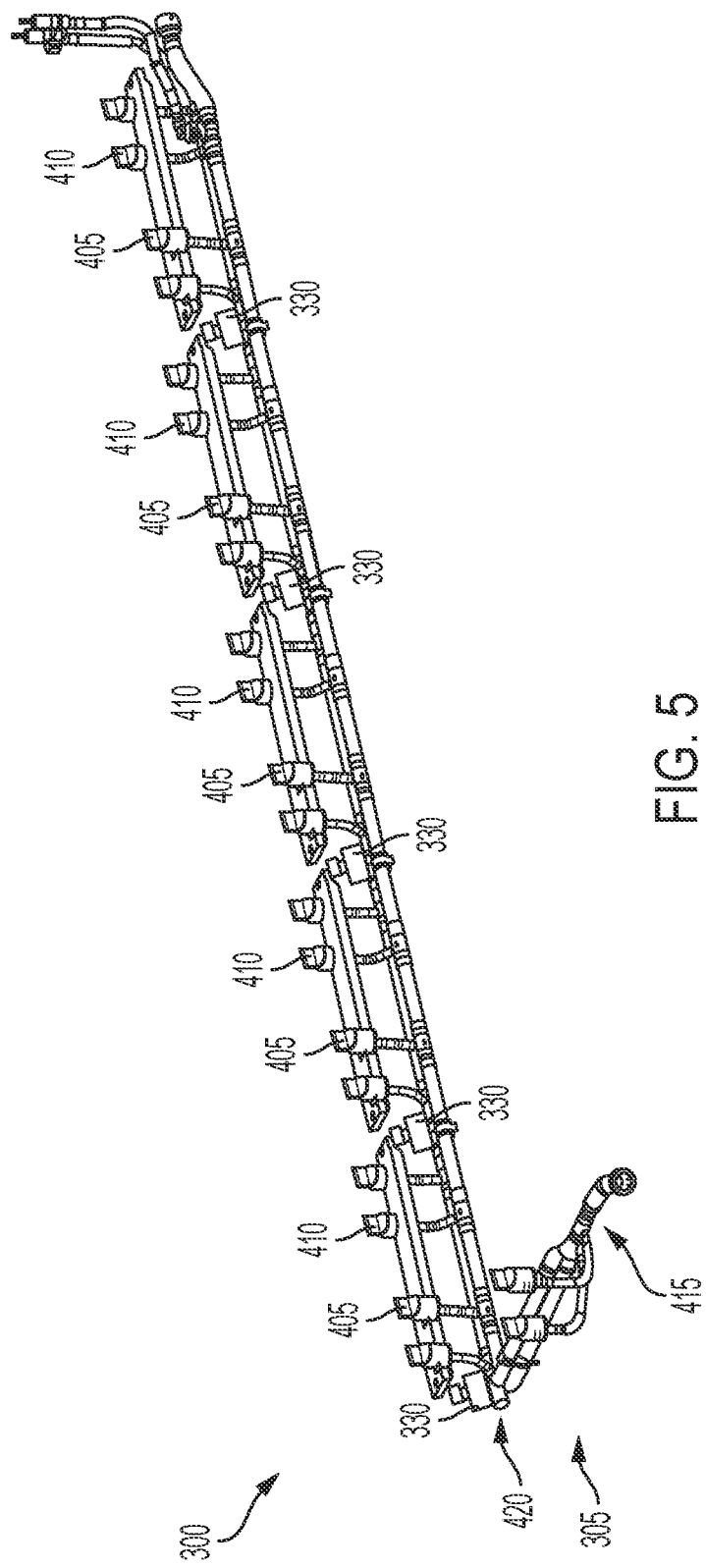
FIG. 5 depicts an example perspective view of a portion of the apparatus of FIG. 3, in accordance with implementations.

FIG. 5 is a perspective view of a portion of the apparatus 300. For example, FIG. 5 depicts a portion of the main line 305 of the apparatus 300. The channel inlets 405 can allow coolant from the main line 305 into (or near) a cold plate 325 to cool a battery cell 120 or battery module 115. The channel outlets 410 can allow coolant from the cold plate 325 back into the main line 305. At least one channel inlet 405 or the channel outlet 410 of the apparatus 300 can be or can couple with at least one valve 330. For example, as described herein and as depicted in at least FIG. 5, the apparatus 300 can include less valves 330 than channel inlets 405 such that the ratio of number of cold plates 325 (and inlets 405) to number of valves 330 is greater than or equal to 2:1 (e.g., 3:1, 4:1, 5:1, or more).

Figure 7:
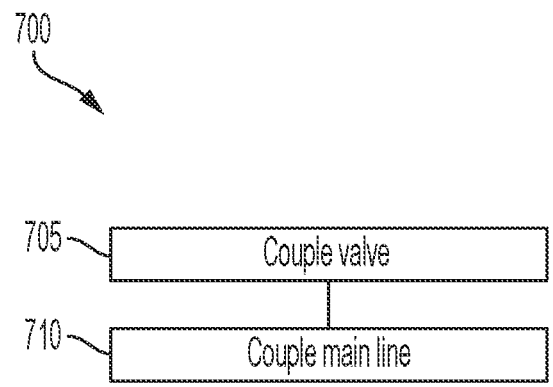
FIG. 7 depicts an example illustration of a process, in accordance with implementations.

FIG. 7 is an example illustration of a method 700. The method 700 can include providing at least one valve 330 and coupling the at least one valve 330 with the main line 305, as depicted in act 705. For example, the valve 330 can be or can include one or more valves, flow regulators, actuators, or other components. For example, the valve 330 can be or can include any one of a two-way valve, a three-way valve, a four-way valve, a five-way valve, a solenoid valve, an actuator, a ball valve, a flow restrictor, any combination thereof, or another type of valve. At least one valve 330 can fluidly couple with the main line 305 to control or regulate fluid flowing through the main line 305 through the valve

330. As another example, multiple valves 330 can fluidly couple with the main line 305 at multiple locations of the main line 305 to control or regulate fluid flowing through the main line 305.

The method 700 can include coupling the valve 330 with a cooling channel 320 to couple the main line with the cooling channel 320, as depicted in act 710. The method 700 can include coupling the cooling channel 320 with the main line 305 by the valve 330, for example. The valve 330 can couple the main line with at least one cooling channel 320 coupled with a cold plate 325. For example, at least one valve 330 can fluidly couple with at least one cooling channel 320 to control or regulate fluid flow between the main line 305 and the cooling channel 320. As another example, multiple valves 330 can each fluidly couple with one or more cooling channels 320 each fluidly coupled with one or more cold plates 325 to control or regulate fluid flow between the main line 305 and each cold plate 325 through the cooling channels 320.

For example, the inlet 310 of the main line 305 of the apparatus 300 (e.g., of the battery pack 110) can receive a coolant. The coolant can flow through the main line 305. The coolant can flow from the main line 305 through at least one cooling channel 320 fluidly coupled with the main line 305 (e.g., when at least one opening of a valve 330 is open or at least partially open). The coolant within the cooling channel 320 can flow through or to at least one cold plate 325. The coolant within the cold plate 325 can facilitate cooling (or warming) one or more battery cells 120 or battery modules 115 coupled with the cold palte 325.

The one or more valves 330 can facilitate controlling fluid flow between the one or more cold plates 325 (e.g., by restricting amount of flow between the cold plates 325). For example, one or more valves 330 can cause coolant within the main line 305 to at least partially bypass one or more cold plates 325 to facilitate reducing a temperature difference between the cold plates 325.

Figure 8:
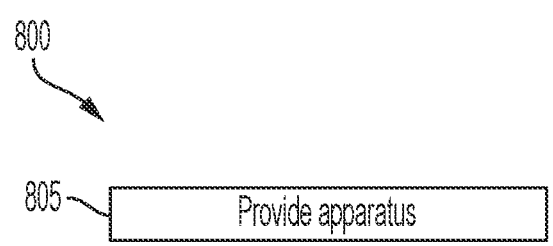
FIG. 8 depicts an example illustration of a process, in accordance with implementations.

FIG. 8 is an example illustration of a method 800. The method 800 can include providing the apparatus 300, as depicted in act 805. The apparatus 300 can include at least one mail line 305 for a coolant to flow through. The main line 305 can fluidly couple with at least one cold plate 325 by a cooling channel 320. The apparatus 300 can include at least one valve 330 fluidly coupled with the main line 305 and cooling channel 320 to control flow of the coolant between the main line 305 and one or more cold plates 325. The one or more valves 330 can facilitate controlling flow of the coolant between various cold plates 325 of the battery pack 110. For example, the one or more valves 330 can cause the coolant within the main line 305 to at least partially bypass at least one cold plate 325. By causing the coolant to at least partially bypass a cold plate 325, more coolant can flow to another cold plate 325 that is not bypassed by the valve 330 (e.g., by following the path of least resistance). The valves 330 can further facilitate controlling flow of coolant within the cold plates 325 such that coolant does not flow through multiple cold plates 325 during one cycle (e.g., from entering an inlet 310 of the main line 305 and exiting an outlet 315 of the main line 305 without passing through a chiller). Therefore, the valves 330 can facilitate minimizing a temperature difference between the plurality of cold plates 325 in the battery pack 110 by controlling fresh, cool coolant flow to various cold plates 325 despite the cold plate positioning relative to the inlet 310 of the main line 305 or a chiller that cools the coolant.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, the inlet and outlet of the main line can be positioned in various locations of a battery pack. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a valve to couple with a thermal line of a battery pack;
the valve coupled with a coolant channel, the coolant channel to couple with a thermal component of the battery pack;
the valve is configured to modify coolant flow with the thermal line and the coolant channel;
the valve configured to allow coolant flow in a first direction from an inlet of the thermal line to an outlet of the thermal line; and
the valve configured to allow coolant flow in a second direction from the outlet of the thermal line to the inlet of the thermal line.

2. The apparatus of claim 1, comprising:
the valve configured to modify coolant flow in a direction from the thermal line to the coolant channel; and
the valve configured to modify coolant flow in a direction from the coolant channel to the thermal line.

3. The apparatus of claim 1, comprising:
the valve to cause coolant within the thermal line to at least partially bypass the coolant channel;
the valve to couple with a second coolant channel; and
the valve to allow the coolant within the thermal line to enter the second coolant channel.

4. The apparatus of claim 1, comprising:
the valve to cause a coolant within the thermal line to at least partially bypass the coolant channel; and
a second valve coupled to a second coolant channel, the second valve to allow the coolant within the thermal line to enter the second coolant channel.

5. The apparatus of claim 1, comprising:
the valve to cause a coolant within the thermal line to at least partially bypass the coolant channel;
the valve to couple with a second coolant channel;
the valve to allow the coolant within the thermal line to enter the second coolant channel; and
the coolant channel closer to the inlet of the thermal line than the second coolant channel.

6. The apparatus of claim 1, comprising:
a controller coupled with the valve;
the valve to receive a signal from the controller; and
the valve to open or close responsive to the signal from the controller.

7. A method, comprising:
coupling a valve with a main line of a battery pack;
coupling, by the valve, the main line of the battery pack with a cooling channel of a thermal component;
the valve configured to allow coolant flow within the main line in a first direction from an inlet of the main line to an outlet of the main line; and
the valve configured to allow coolant flow in a second direction from the outlet of the main line to the inlet of the main line.

8. The method of claim 7, comprising:
the cooling channel is a first cooling channel and the thermal component is a first thermal component;
coupling, by the valve, the main line with a second cooling channel of a second thermal component;
causing, by the valve, a coolant within the main line to at least partially bypass the first cooling channel; and
causing, by the valve, the coolant within the main line to enter the second cooling channel.

9. The method of claim 7, comprising:
the cooling channel is a first cooling channel, the valve is a first valve, and the thermal component is a first thermal component;
coupling, by a second valve, the main line with a second cooling channel of a second thermal component;
causing, by the first valve, a coolant within the main line to at least partially bypass the first cooling channel; and
causing, by the second valve, the coolant within the main line to enter the second cooling channel.

10. The method of claim 7, comprising:
the cooling channel is a first cooling channel and the thermal component is a first thermal component;
causing, by the valve, a coolant within the main line to at least partially bypass the first cooling channel;
coupling, by the valve, the main line with a second cooling channel of a second thermal component; and
the first cooling channel closer to the inlet of the main line than the second cooling channel.

11. The method of claim 7, comprising:
the thermal component coupled with a battery module; and
providing, by the cooling channel, a coolant to the thermal component to cool the battery module.

12. The method of claim 7, comprising:
the thermal component coupled with a battery cell; and
providing, by the cooling channel, a coolant to the thermal component to cool the battery cell.

13. The method of claim 7, comprising:
the valve comprises at least one of a two-wave valve, a four-way valve, or a five-way valve.

14. An electric vehicle, comprising:
a valve to couple with a main line of a battery pack;
the valve to couple the main line of the battery pack with a cooling channel of a cold plate;
the valve configured to allow coolant flow within the main line in a first direction from an inlet of the main line to an outlet of the main line; and
the valve configured to allow coolant flow in a second direction from the outlet of the main line to the inlet of the main line.

15. The electric vehicle of claim 14, comprising:
the cooling channel is a first cooling channel and the cold plate is a first cold plate;
the valve to couple the main line with a second cooling channel of a second cold plate;
the valve to cause a coolant within the main line to at least partially bypass the first cooling channel; and
the valve to allow the coolant within the main line to enter the second cooling channel.

16. The electric vehicle of claim 14, comprising:
the cooling channel is a first cooling channel, the valve is a first valve, and the cold plate is a first cold plate;
a second valve to couple the main line with a second cooling channel of a second cold plate;
the first valve to cause a coolant within the main line to at least partially bypass the first cooling channel; and
the second valve to allow the coolant within the main line to enter the second cooling channel.

17. The electric vehicle of claim 14, comprising:
the cooling channel is a first cooling channel and the cold plate is a first cold plate;
the valve to cause a coolant within the main line to at least partially bypass the first cooling channel;
the valve to couple the main line with a second cooling channel of a second cold plate; and
the first cooling channel is closer to the inlet of the main line than the second cooling channel.

18. The electric vehicle of claim 14, comprising:
the cold plate coupled with a battery module; and
the cooling channel to provide a coolant to the cold plate to cool the battery module.

19. The electric vehicle of claim 14, comprising:
the cold plate coupled with a battery cell; and
the cooling channel to provide a coolant to the cold plate to cool the battery cell.

\* \* \* \* \*